United States Patent
Bertz et al.

(10) Patent No.: US 8,060,073 B1
(45) Date of Patent: Nov. 15, 2011

(54) SYSTEM AND METHOD FOR PROVISIONING A COMMUNICATION DEVICE BASED UPON DEVICE CAPABILITY

(75) Inventors: Lyle T. Bertz, Lee's Summit, MO (US); Christopher J. Mateski, Overland Park, KS (US); Christian Erik Seagren, Pleasanton, KS (US); Jeremy R. Breau, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 483 days.

(21) Appl. No.: 12/368,096

(22) Filed: Feb. 9, 2009

(51) Int. Cl.
*H04M 3/00* (2006.01)

(52) U.S. Cl. ....... 455/418; 455/3.01; 455/419; 455/466; 709/202; 709/203; 709/217; 709/224; 709/225; 709/227; 709/228; 709/229; 709/230; 717/168; 717/174; 717/176; 717/177; 717/178

(58) Field of Classification Search .............. 455/3.01, 455/418, 419, 466; 709/202, 203, 217, 224, 709/225, 226, 227, 228, 229, 230; 717/168, 717/174, 176, 177, 178

See application file for complete search history.

(56) References Cited

U.S. PATENT DOCUMENTS

| | | | |
|---|---|---|---|
| 5,995,829 A * | 11/1999 | Broderick | 455/418 |
| 7,353,017 B2 * | 4/2008 | Chen et al. | 455/414.2 |
| 7,353,512 B2 * | 4/2008 | Katz et al. | 717/178 |
| 7,870,255 B2 * | 1/2011 | Shenfield et al. | 709/225 |
| 2002/0123335 A1 | 9/2002 | Luna et al. | |
| 2003/0084177 A1 | 5/2003 | Mulligan | |
| 2004/0103171 A1 | 5/2004 | Mullis et al. | |
| 2007/0093243 A1 | 4/2007 | Kapadekar et al. | |
| 2007/0169093 A1 | 7/2007 | Logan et al. | |
| 2007/0190939 A1 | 8/2007 | Abel | |
| 2008/0212503 A1 | 9/2008 | Lipford et al. | |

\* cited by examiner

*Primary Examiner* — Olumide T Ajibade Akonai

(57) ABSTRACT

A method is presented for provisioning a communication device. In the method, a call initiated by the communication device to initiate a first form of provisioning of the device is received. In response to the call, capabilities of the communication device are requested. In response to the request, an indication of whether the communication device supports a second form of provisioning different from the first form of provisioning is received. Based on the indication received, provisioning of the communication device using the second form of provisioning is initiated, or the communication device is provisioned using the first form of provisioning.

18 Claims, 5 Drawing Sheets

SYSTEM AND METHOD FOR PROVISIONING A COMMUNICATION DEVICE BASED UPON DEVICE CAPABILITY

TECHNICAL BACKGROUND

Oftentimes, a communication device must be provisioned prior to being fully employed within a communication network to facilitate communication with other users. This provisioning is particularly important for wireless communication devices, such as cellular phones or personal digital assistants (PDAs). For example, a wireless communication device is normally programmed with both a mobile identification number (MIN) and a mobile directory number (MDN) to access a wireless communication network to communicate with other communication devices. More specifically, a wireless service provider or carrier assigns a unique MIN and MDN to each phone sold or otherwise provided to a user. If the user subsequently switches to another service provider, the new provider typically assigns the phone a new MIN that is associated with the new carrier. However, the MDN, which represents the actual phone number another party would dial to initiate a connection with the device, may remain the same to facilitate phone number portability, although the user may choose a new MDN to be assigned to the phone. The programmable or provisioning nature of the MDN and the MSN are thus distinguished from the electronic serial number (ESN) or mobile equipment identity (MEID), which the phone manufacturer permanently assigns to allow identification of the phone hardware, and which may be useful in the case of theft or loss of the phone.

In many cases, the wireless service provider may provision a wireless communication device with parameters or values in addition to the MIN and MDN to facilitate the use of a variety of services by the device, such a voice communication, short message service (SMS), Internet access, picture mail, and video mail.

While some provisioning of a wireless communication device may be performed manually by a technician at the time the device is conveyed to the user, most or all of the provisioning may instead be accomplished remotely by way of a server accessible via the wireless communication network. One such method of remote provisioning is termed "over-the-air function" (OTAF), in which an OTAF server is coupled with a wireless communication device requesting provisioning by way of a mobile switching center (MSC). Typically, a user initiates such provisioning by way of a specialized call, such as "*2" on the cellular phone for customer service, which the MSC then routes to the OTAF server.

Another form of remote provisioning is Internet-based over-the-air (IOTA) provisioning, which is accomplished by way of a data session between a wireless communication device requesting provisioning and an OTAF server coupled to the Internet. As with OTAF provisioning, an MSC may provide the connection between the device and the IOTA server. However, to initiate the data session, the IOTA server typically requires a phone number, such as the MIN or MDN described above, to be programmed into the wireless communication device prior to the data session.

OVERVIEW

Discussed herein is a method for provisioning a communication device in a communication network. In the method, a call initiated by the device to initiate a first form of provisioning of the device is received. In response to the call, capabilities of the communication device are requested. In response to that request, an indication as to whether the communication device supports a second form of provisioning different from the first form of provisioning is received. If the indication received signifies that the device supports the second form of provisioning, provisioning of the device using the second form of provisioning is initiated. Otherwise, the communication device is provisioned using the first form of provisioning.

Also presented herein is a communication system including first, second, and third nodes. The first and second nodes are communicatively coupled with each other, and the third node is communicatively coupled to the first node. The first node is configured to receive a call initiated by a non-provisioned communication device to initiate a first form of provisioning of the device. The first node is also configured to request capabilities of the communication device from the third node in response to the call. The third node is configured to transmit an indication as to whether the communication device supports a second form of provisioning different from the first form of provisioning to the first node in response to the request. The first node is also configured to initiate provisioning of the communication device using the second form of provisioning by way of the second node if the communication device supports the second form of provisioning based on the indication, and otherwise to provision the device using the first form of provisioning.

Also discussed herein is a node for a communication system. The node includes a communication interface and control logic. The communication interface is configured to receive a call initiated by a non-provisioned communication device to initiate a first form of provisioning by the node. The control logic is configured to generate a request for capabilities of the communication device. The communication interface is further configured to transfer the request to a third node, and to receive from the third node an indication of whether the device supports a second form of provisioning different from the first form of provisioning. Further, the control logic is configured to provision the communication device according to the first form of provisioning by way of the communication interface if the communication device does not support the second form of provisioning based on the indication, and otherwise to initiate the second form of provisioning of the device by way of the communication interface to a second node supporting the second form of provisioning.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

The following description and associated figures depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
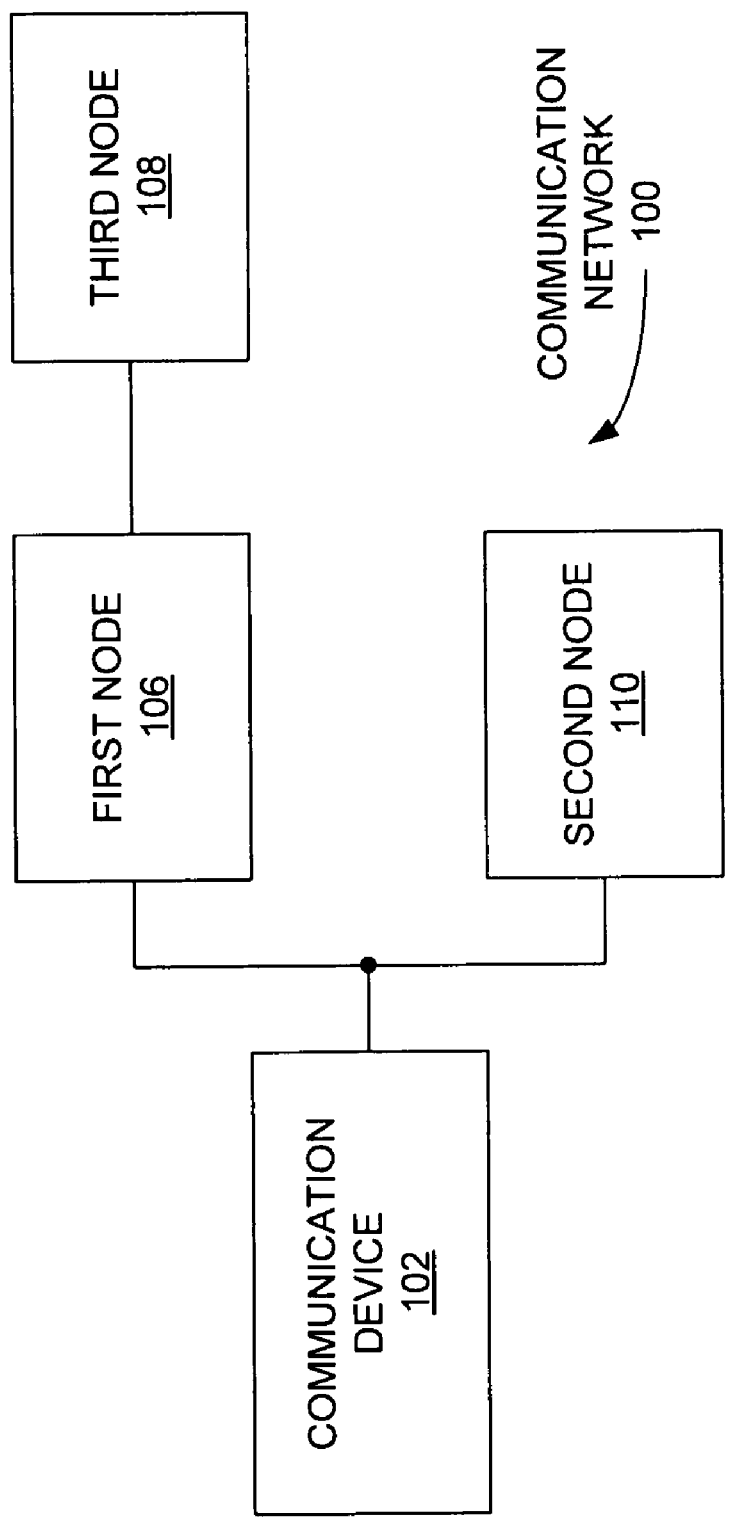
FIG. 1 is a block diagram of a communication network according to an embodiment of the invention.

FIG. 1 provides a block diagram of a communication network 100 according to an embodiment of the invention. The network 100 includes a communication device 102, a first node 106, a second node 110, and a third node 108. The communication device 102 is communicatively coupled to the first node 106 and the second node 110, and the first node 106 is communicatively coupled to the second node 110 and the third node 108. The communication device 102 may be any communication device suited for operation with the network 100, including, but not limited to, a wireline, wireless, or optical communication device, depending on the capabilities of the network 100. While FIG. 1 only depicts the components mentioned above, other communication devices, such as nodes, routers, and the like, may also be employed in the system 100 to couple the nodes 106, 108, 110 and the communication device 102 together as shown in FIG. 1 without departing from the scope of the invention discussed herein.

The first node 106 is configured to provision the communication device 102 according to a first form or protocol of provisioning. Similarly, the second node 110 is configured to provision the communication device 102 according to a second form of provisioning different from the first form of provisioning. The third node 108 is configured to provide, upon request from the first node 106, an indication of least one capability or trait of the communication device 102.

Figure 2:
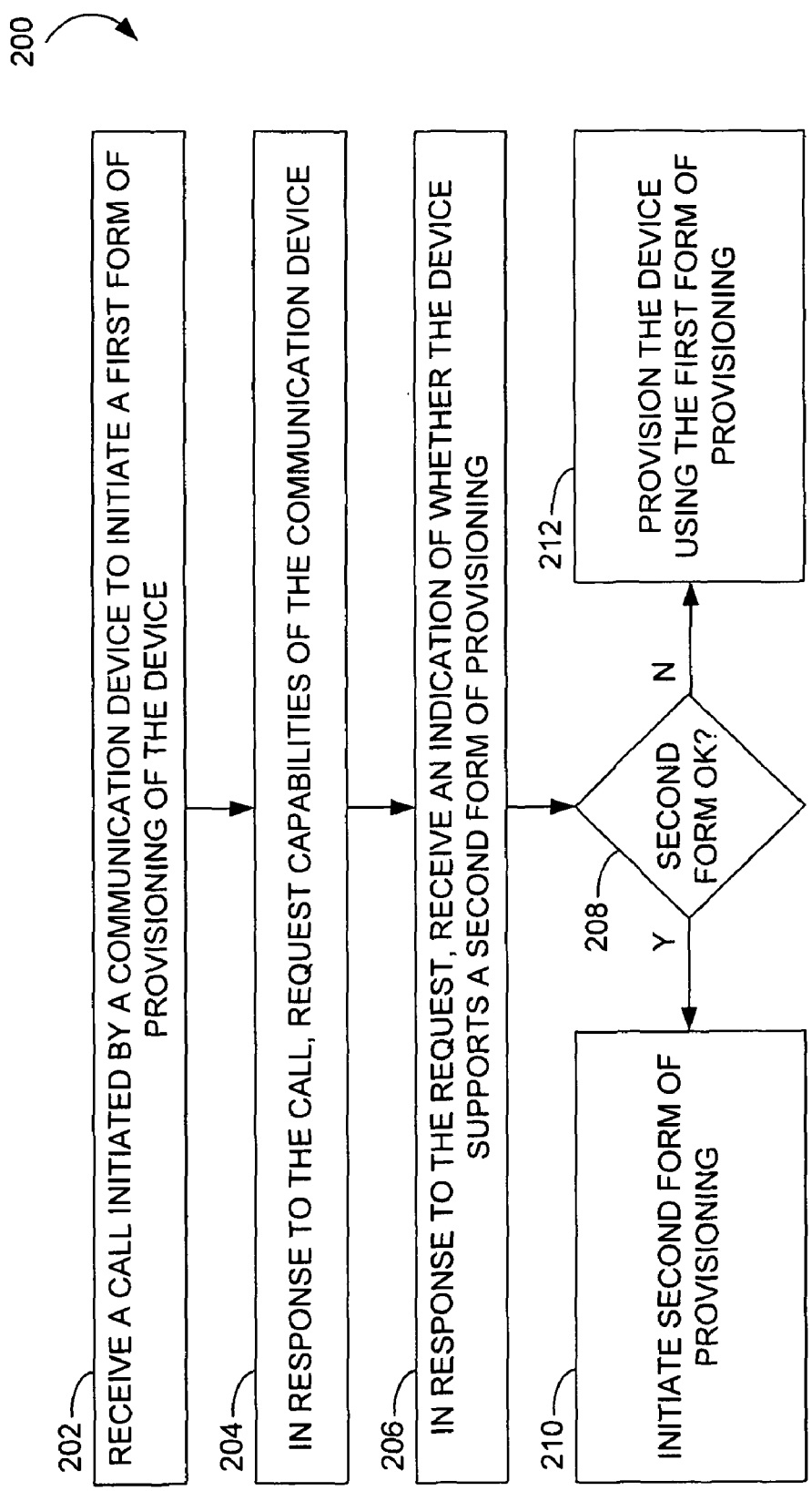
FIG. 2 is flow diagram of a method according to an embodiment of the invention for provisioning a communication device.

Presented in FIG. 2 is a flow diagram of a method 200 according to an embodiment of the invention for provisioning a communication device for a communication network. The method 200 is described below specifically within the context of the communication network 100 of FIG. 1. However, the method 200 may also be employed to provision other communication devices in alternative communication networks aside from the network 100 of FIG. 1 while remaining within the scope of the invention. For example, the various operations and capabilities discussed herein that are associated with any two or more of the nodes 106, 108, 110 may be incorporated within a single communication network node in other implementations while remaining with the scope of the present invention.

In the method 200, the first node 106 receives a call initiated by the communication device 102 to initiate a first form of provisioning of the device 102 (operation 202). In response to the call, the first node 106 requests capabilities of the communication device 102 from the third node 108 (operation 204). In response to the request, the first node 106 receives from the third node 108 at least an indication of whether the communication device 102 supports the use of a second form of provisioning different from the first form of provisioning (operation 206). Based on the indication received (operation 208), the first node 106 either initiates provisioning of the communication device 102 using the second form of provisioning by way of the second node 110 if the communication device 102 supports the second form of provisioning (operation 210). Otherwise, the first node 106 provisions the communication device 102 using the first form of provisioning (operation 212).

Figure 3:
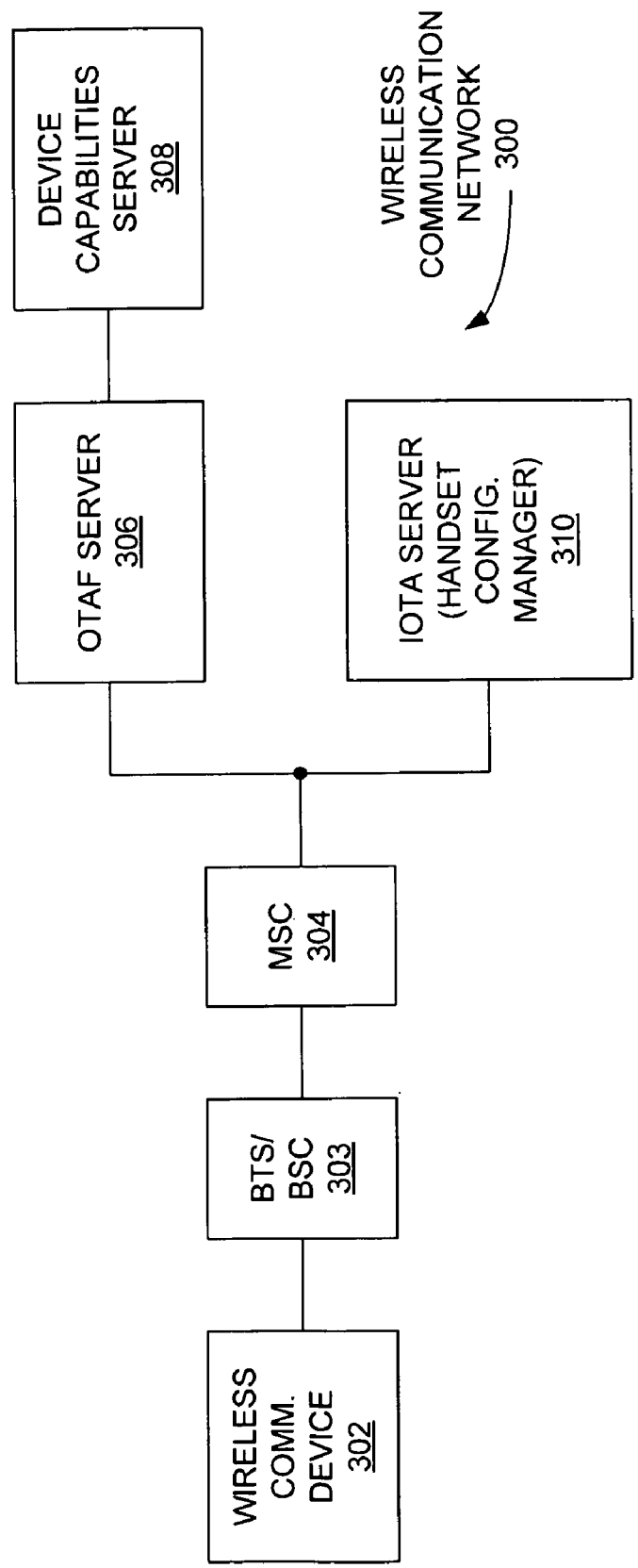
FIG. 3 is a block diagram of a wireless communication network according to another embodiment of the invention.

FIG. 3 depicts a wireless communication network 300 according to another embodiment of the invention. Included in the network 300 are a wireless communication device 302, a base station transceiver (BTS) 303 (possibly coupled with a base station controller (BSC)), a mobile switching center (MSC) 304, and several nodes, such as an over-the-air function (OTAF) provisioning server 306, a device capabilities server 308, and an Internet-based over-the-air (IOTA) provisioning server 310. Other communication components, such as switches, routers, and the like, may be incorporated within the network 300 to couple the various devices depicted in FIG. 3, but are not displayed therein to simplify the following discussion.

The wireless communication device 302 may be any communication device capable of communicating wirelessly with the BTS 303, such as by way of code division, multiple access (CDMA) or other wireless communication technologies. The device 302 may be a cellular phone, a personal digital assistant (PDA), computer, or other device capable of sending and/or receiving information wirelessly.

The BTS 303 provides a communication path between the wireless communication device 302 and the MSC 304. The BTS 303 may further reformat or otherwise process or control the communications received from the MSC 304 before transferring the communications to the MSC 304, and vice-versa. In one implementation, the BTS 303 services the particular geographic area in which the wireless communication device 302 resides by way of at least one antenna. More specifically, the BTS 303 may subdivide the serviced geographical area into multiple sectors, thus allowing concurrent communications with a significant number of wireless communication devices simultaneously.

The MSC 304 is configured to couple the wireless communication device 302 with a transport network, such as a public switched telephone network (PSTN) or the Internet, to facilitate communications between the wireless communication device 302 and other communication devices. Typically, the MSC 304 is coupled with multiple BTSs (not shown in FIG. 3) in addition to the BTS 302 of FIG. 3. Thus, the MSC 304 may facilitate communications between the wireless communication device 302 and another wireless communication device located in the geographic areas serviced by the BTS 303, between the wireless communication device 302 and another wireless communication device serviced by a separate BTS, and between the device 302 and another communication device accessible via the PSTN, the Internet, or another communication network.

The OTAF (over-the-air function) server 306 is configured to provision the wireless communication device 302 by way of the MSC 304 and BTS 303, according to an OTAF form of provisioning known in the art so that the wireless communication device 302 may access one or more communication services supplied by the wireless communication network 300. Such services include, but are not limited to, voice communication, text communications using SMS, voice mail, picture mail, video mail, and web access. In one implementation, the wireless communication device 302 may request provisioning by way of a call routed to the OTAF server 304, as described in greater detail below. The OTAF server 304, upon receiving the call, may then provision the wireless communication device 302 by programming one or more provisioning values, such as the MIN and/or MDN associated with the device, into the device 302, thus allowing the device 302 to access at least one service provided by the wireless communication network 300.

The IOTA (Internet-based over-the-air) server 310 is configured to provision the wireless communication device 302 according to an IOTA form of provisioning known in the art so that the wireless communication device 302 may access one or more communication services supplied by the wireless communication network 300, as mentioned above. Generally, IOTA provisioning is more complete or thorough that the OTAF provisioning available from the OTAF server 306. IOTA provisioning typically employs the use of a data session between the OTAF server 306 and the device being provisioned (in this case, the wireless communication device 302) to facilitate the transfer of data from the OTAF server 306 necessary to provision the device.

The device capabilities server 308 is configured to transmit one or more capabilities of the wireless communication device 302 to the OTAF server 306 in response to a request for this information. In one embodiment, the device capabilities server 308 transmits at least an indication as to whether the wireless communication device 302 possesses the capability to be provisioned according to IOTA provisioning. More generally, the device capabilities server 308 may include device capabilities and/or user preferences associated with multiple communication devices communicating with the wireless communication network 300. In one example, the device transmits the indication of IOTA provisioning capability according to the composite capabilities/preferences profile (CC/PP) technology known in the art.

Figure 4:
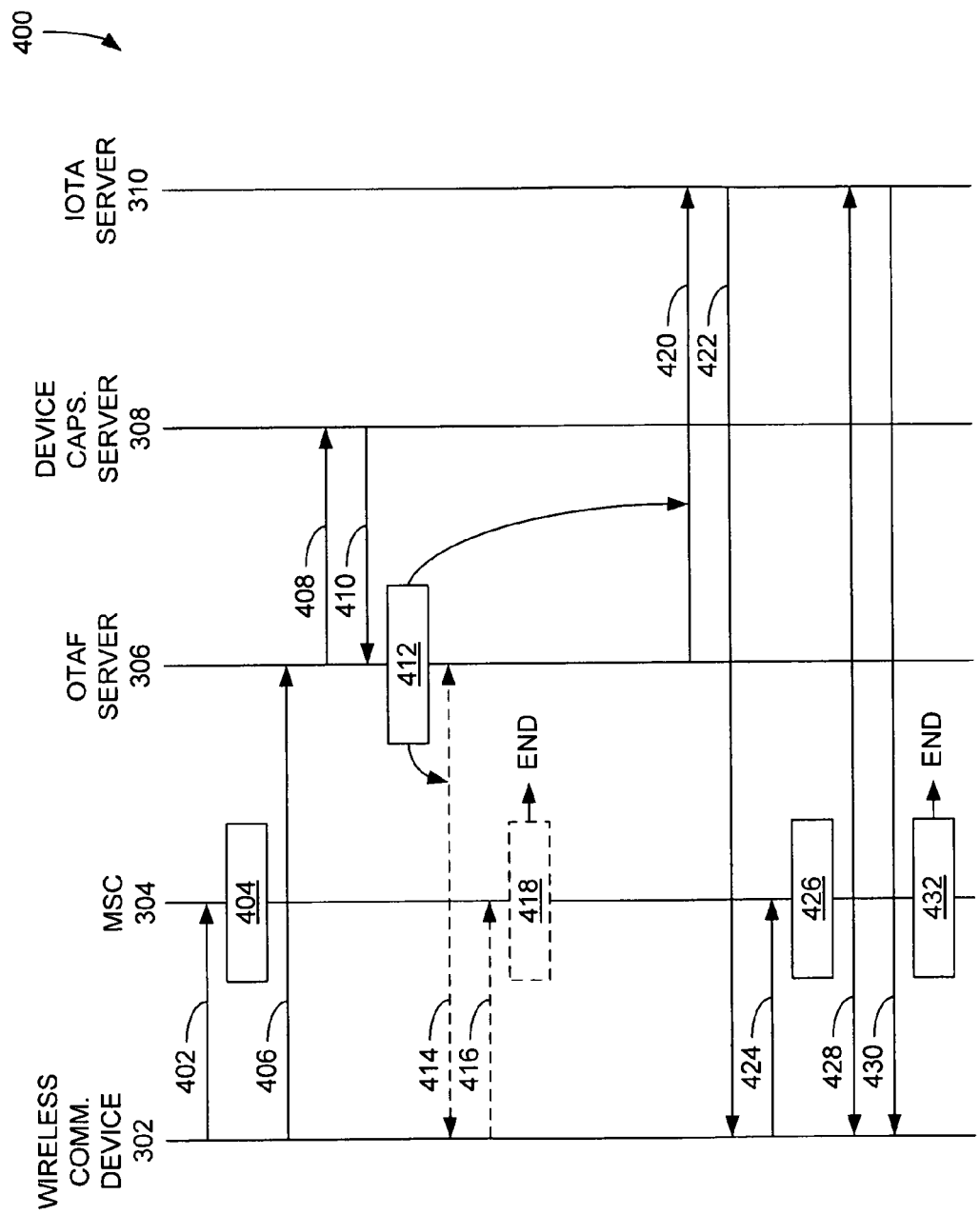
FIG. 4 is a graphical representation of communications employed in provisioning a wireless communication device in the wireless communication system of FIG. 3 according to an embodiment of the invention.

FIG. 4 presents a diagram depicting various communications and actions for provisioning the wireless communication device 302 of FIG. 3 according to one implementation. Initially, the wireless communication device 302 is presumed to be non-provisioned from the standpoint that the device 302 is not currently assigned a mobile identification number (MIN) and/or a mobile directory number (MDN). To initiate the provisioning of the wireless communication device 302, the device 302 may initiate a call to a number recognizable by the MSC 304 as a possible request for provisioning (operation 402). For example, the call may be initiated by way of dialing the sequence "*2", which may indicate a call for customer support provided by the access provider or carrier. The MSC 304, upon receiving the call, may conclude that the device 302 has not yet been assigned an MIN and/or MDN, and thus interprets the call as a request for OTAF provisioning.

In response to receiving the call (operation 402), the MSC 304 may then assign a temporary routing number (TRN) to the wireless communication device 302 (operation 404) to allow the device to engage in communication with the network 300 to facilitate OTAF provisioning. Using the TRN, the MSC 304 may then route the call to the OTAF server 306 (operation 406).

After the OTAF server 306 receives the call from the wireless communication device 302, the OTAF server 306 first attempts to determine whether the wireless communication device 302 supports IOTA provisioning before proceeding with OTAF provisioning. Accordingly, the OTAF server 306 issues a request to the device capabilities server 308 for an indication as to whether the device 302 supports IOTA provisioning (operation 408). More generally, the OTAF server 306 may request any capabilities and/or preferences associated with the wireless communication device 302, such as by way of the CC/PP protocol mentioned above. In response to the request, the device capabilities server 308 returns at least the indication of IOTA provisioning mentioned above (operation 410). This indication may also be accompanied with other capabilities and/or preferences of the device 302, such as those typically included in a response under the CC/PP standard.

After the OTAF server 306 receives the indication, the OTAF server then determines whether the wireless communication device 302 is to be provisioned using OTAF provisioning or IOTA provisioning (operation 412). If the wireless communication device 302 does not support IOTA provisioning, the OTAF server commences with OTAF provisioning of the wireless communication device 302 using the call that was set up by the MSC 304 by way of the TRN (operation 414). In one implementation, the OTAF server 306 at least assigns an MIN and/or MDN to the wireless communication device 302, and may perform additional provisioning during the call. After the OTAF provisioning is complete, the device 302 may then end the call (operation 416), to which the MSC 302 may then respond by releasing the TRN assigned for the call (operation 418), thus ending the provisioning of the device 302.

If, instead, the OTAF server 306 determines by way of the indication received from the device capabilities server 308 that the wireless communication device 302 supports IOTA provisioning (operation 412), the OTAF server 306 may then initiate provisioning of the wireless communication device 302 by transmitting a request for IOTA provisioning to the IOTA server 310, which may also be termed a handset configuration manager (operation 420).

In response to the IOTA provisioning request 420, the IOTA server 310 may then employ the previously-assigned TRN to transmit a rendezvous request by way of the MSC 304 to the wireless communication device 302 (operation 422). In one embodiment, the rendezvous request 422 is a Wireless Access Protocol (WAP) "Push" to the device 302. As currently used, WAP is a standard allowing Internet access from a wireless communication device, such as the device 302 of FIG. 3. Further, the WAP Push maybe carried in a short message service (SMS) message transmitted to the wireless communication device 302. Also, the WAP Push may include a WAP address from which the device 302 is to access provisioning information.

In response to the WAP Push, the wireless communication device 302 ends the previous OTA call by way of the MCS 304 (operation 424). After receiving the call termination, the MCS 304 is free to release the TRN associated with that call (operation 426).

Subsequently, the wireless communication device 302 may then initiate a data session with the IOTA server 310 to facilitate the provisioning of the device 302 (operation 428). Such a data session is typically required in IOTA provisioning to facilitate the transfer of provisioning data to the device 302. In one implementation, the device 302 uses the WAP address mentioned above to initiate the data session. Moreover, the wireless communication device 302 may start the data session using WAP "profile 0", indicating to the IOTA server 310 that a minimum or default level of capability for the data session by the device 302 should be presumed.

While WAP is the communication protocol chosen for the particular example of FIGS. 3 and 4, other communication protocols capable of allowing the IOTA server 310 to provision or program the wireless communication device 302 may be utilized in other implementations.

Once the wireless communication device 302 has created the data session, the IOTA server 310 may then provision the wireless communication device 302 by assigning the device 302 at least a MIN and/or MDN using the data session (operation 430). Other provisioning for phone, text, video, and data-related services provided by way of the wireless communication network 300 may also be performed. Once the IOTA server 310 completes the provisioning of the wireless communication device 302, the MCS 304 ends the data session (operation 432).

Figure 5:
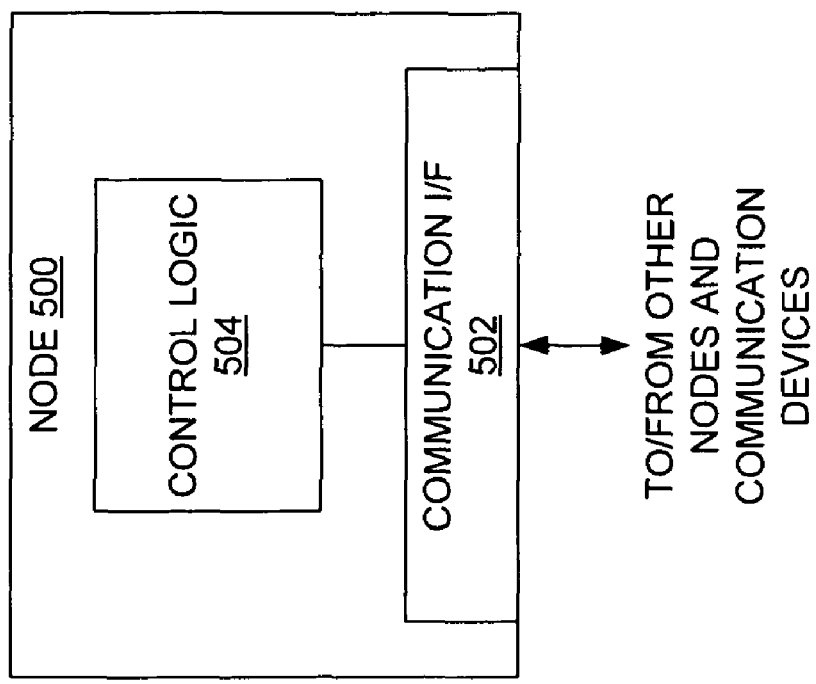
FIG. 5 is a simplified block diagram of a node for a communication system according to an embodiment of the invention.

FIG. 5 provides a simplified block diagram of a node 500, such as the OTAF server 306 of FIG. 3 for provisioning a wireless communication device. The node 500 includes a communication interface 502 and control logic 504. The communication interface 502 may be one or more communication interfaces allowing the node 500 to communicate with an MSC (such as the MSC 304 of FIG. 3) and other nodes (such as the device capabilities server 308 and the IOTA server 310 of FIG. 3).

The control logic 504 may be any logic or circuitry capable of performing the tasks recited below. For example, the control logic 504 may include one or more processors, such as microprocessors, microcontrollers, and digital signal processors (DSPs), configured to execute software or firmware instructions for employing such tasks. In another implementation, the control logic 504 may include hardware logic, or a combination of hardware and software elements.

The communication interface 502 of the node 500 is configured to receive a call initiated by a non-provisioned wireless communication device (e.g., the wireless communication device 302 of FIG. 3) to initiate a first type of provisioning by the node 500. The control logic 504 is configured to generate a request for capabilities of the wireless communication device, and transfer the request through the communication interface 502. The communication interface 502 is configured to receive an indication of whether the wireless communication device supports a second form of provisioning different from the first form of provisioning. The control logic 504 is further adapted to provision the wireless communication device if the device does not support the second form of provisioning. Otherwise, the control logic 504 is configured to initiate the second form of provisioning by way of the communication interface 502 to a second node that supports the second form of provisioning. Other tasks, features, and characteristics described in conjunction with the OTAF server 306 of FIG. 3, as well as the device capabilities server 308 and the IOTA server 310 of FIG. 3, may also be incorporated into the node 500.

While the node 500 of FIG. 5 described above is particularly suited for the provisioning of wireless communication devices, other nodes similar to the node 500 that are configured to provision wireline communication devices, optical communication device, or other types of communication devices, may be configured substantially as discussed above with respect to the node 500.

More generally, while the majority of the implementations described above are directed to the provisioning of wireless or mobile communication devices, such as cellular phones and PDAs, other types of communication devices, such as wireline and optical communication devices, that may require some level of provisioning may be provisioned in accordance with many aspects of the implementations discussed herein while remaining within the scope of the invention. For example, various nodes or servers of a wireline communication network, such as a public switched telephone network (PSTN), may perform functions analogous to those associated with the various nodes and servers of the wireless communication network 300 of FIG. 3 to provision a wireline communication device coupled thereto.

Various embodiments as described above provide automatic selection of an improved provisioning protocol for a non-provisioned communication device if the device supports that protocol. In one embodiment, in response to the device requesting provisioning according to a first provisioning type, a node of the first provisioning type receiving the request may determine if the device supports a second, more complete provisioning protocol by way of capability data representing the device. If so, the first node may issue a request to a second node supporting the second provisioning protocol to provision the wireless communication device according to the second protocol. Otherwise, the device is provisioned by the first node according to the first provisioning protocol. As a result, the more complete provisioning protocol compatible with the communication device is automatically selected to provision the device with minimal input therefrom.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for provisioning a communication device, the method comprising:
receiving a call initiated by a communication device to initiate a first form of provisioning of the communication device; in response to the call, requesting capabilities of the communication device; receiving, in response to the request, an indication of whether the communication device supports a second form of provisioning different from the first form of provisioning; and based on the indication, initiating provisioning of the communication device using the second form of provisioning if the communication device supports the second form of provisioning, and otherwise provisioning the communication device using the first form of provisioning; wherein the first form of provisioning comprises over-the-air function (OTAF) provisioning; and the second form of provisioning comprises Internet-based over-the-air (IOTA) provisioning.

2. The method of claim 1, wherein initiating the provisioning of the communication device using the second form of provisioning comprises transmitting a second request for the second form of provisioning.

3. The method of claim 2, further comprising:
at a switch, receiving the call initiated by the communication device to initiate the first form of provisioning of the communication device, and routing the call.

4. The method of claim 3, further comprising:
in response to the second request, transmitting a rendezvous request by way of the switch to the communication device;
at the communication device, in response to the rendezvous request, terminating the call, and initiating a data session by way of the switch;
provisioning the communication device using the second form of provisioning by way of the data session; and
at the switch, after the provisioning of the communication device, terminating the data session.

5. The method of claim 4, further comprising:
at the switch, in response to the call initiation, assigning a temporary routing number to the communication device, wherein the call is routed using the temporary routing number; and
at the switch, in response to the call termination, releasing the temporary routing number.

6. The method of claim 4, wherein the rendezvous request comprises a wireless access protocol push transmitted via a short message service.

7. The method of claim 4, wherein the data session is initiated using a default data session profile.

8. The method of claim 4, wherein provisioning the communication device comprises assigning at least one of a mobile identification number and a mobile directory number to the communication device.

9. The method of claim 1, wherein the call comprises a call to a customer service number.

10. The method of claim 1, wherein transmitting the indication comprises transmitting a composite capabilities/preferences profile comprising the indication.

11. A communication system, comprising:
a first node and a second node communicatively coupled with each other; and
a third node communicatively coupled with the first node; wherein the first node is configured to receive a call initiated by a non-provisioned communication device to initiate a first form of provisioning of the communication device, and to request capabilities of the communication device from the third node in response to the call; wherein the third node is configured to transmit to the first node in response to the request an indication of whether the communication device supports a second form of provisioning different from the first form of provisioning; and wherein the first node is configured to initiate provisioning of the communication device using the second form of provisioning by way of the second node if the communication device supports the second form of provisioning based on the indication, and otherwise to provision the communication device using the first form of provisioning; wherein: the first form of provisioning comprises over-the-air function (OTAF) provisioning; the first node comprises an OTAF server; the second form of provisioning comprises Internet-based over-the-air (IOTA) provisioning; and the second node comprises an IOTA server.

12. The communication system of claim 11, further comprising:
a switch communicatively coupled with the first node and the second node, wherein the switch is configured to receive the call initiated by the non-provisioned communication device, and route the call to the first node.

13. The communication system of claim 12, wherein:
to initiate the provisioning of the communication device using the second form of provisioning, the first node is configured to transmit a second request for the second form of provisioning to the second node;
the second node is configured to transmit a rendezvous request to the communication device by way of the switch in response to the second request;
the communication device is configured to terminate the call with the first node and initiate a data session with the second node by way of the switch in response to the rendezvous request;
the second node is configured to provision the communication device using the second form of provisioning by way of the data session; and
the switch is configured to terminate the data session after the provisioning of the communication device.

14. The communication system of claim 13, wherein:
the switch is configured to assign a temporary routing number to the communication device and route the call using the temporary routing number in response to the call initiation, and to release the temporary routing number in response to the call termination.

15. The communication system of claim 13, wherein the second node is configured to transmit the rendezvous request by transmitting a wireless access protocol push by way of a short message service.

16. The communication system of claim 11, wherein the call comprises a call to a customer service number.

17. The communication system of claim 11, wherein the third node is configured to transmit the indication to the first node by transmitting a composite capabilities/preferences profile comprising the indication.

18. A node for a communication system, the node comprising: a communication interface configured to receive a call initiated by a non-provisioned communication device to initiate a first form of provisioning by the node; and control logic configured to generate a request for capabilities of the communication device; wherein the communication interface is configured to transfer the request to a third node, and to receive from the third node in response to the request an indication of whether the communication device supports a second form of provisioning different from the first form of provisioning; wherein the control logic is configured to provision the communication device according to the first form of provisioning by way of the communication interface if the communication device does not support the second form of provisioning based on the indication, and otherwise to initiate the second form of provisioning of the communication device by way of the communication interface to a second node supporting the second form of provisioning; wherein the first form of provisioning comprises over-the-air function (OTAF) provisioning; and the second form of provisioning comprises Internet-based over-the-air (IOTA) provisioning.

* * * * *